(12) United States Patent  (10) Patent No.: US 9,252,571 B2
Tanaka et al.  (45) Date of Patent: Feb. 2, 2016

(54) TERMINAL BOX (71) Applicant: Hosiden Corporation, Yao (JP)

(72) Inventors: Toshiya Tanaka, Yao (JP); Yuta Ogawa, Yao (JP)

(73) Assignee: Hosiden Corporation, Osaka (JP)

( * ) Notice: Subject to any disclaimer, the term of this patent is extended or adjusted under 35 U.S.C. 154(b) by 116 days.

(21) Appl. No.: 14/270,731

(22) Filed: May 6, 2014

(65) Prior Publication Data

US 2014/0334072 A1  Nov. 13, 2014

(30) Foreign Application Priority Data

May 9, 2013 (JP) .................................. 2013-099419

(51) Int. Cl.
H05K 7/00 (2006.01)
H05K 5/00 (2006.01)
H02B 1/26 (2006.01)
H02S 40/34 (2014.01)

(52) U.S. Cl.
CPC . H02B 1/26 (2013.01); H02S 40/34 (2014.12)

(58) Field of Classification Search
None
See application file for complete search history.

(56) References Cited

U.S. PATENT DOCUMENTS

| 6,462,265 | B1 | 10/2002 | Sasaoka et al. | |
|---|---|---|---|---|
| 8,128,439 | B2* | 3/2012 | Feldmeier | B32B 17/10036 439/709 |
| 2006/0180196 | A1* | 8/2006 | Lares | H01R 4/70 136/251 |
| 2006/0283628 | A1* | 12/2006 | Feldmeier | B32B 17/10036 174/260 |
| 2008/0302410 | A1* | 12/2008 | Aoyama | H01L 25/072 136/251 |
| 2011/0017281 | A1* | 1/2011 | Funakoshi | H01L 31/02008 136/251 |
| 2011/0073362 | A1 | 3/2011 | Shimizu | |
| 2011/0195585 | A1* | 8/2011 | Feldmeier | B32B 17/10036 439/110 |
| 2012/0118360 | A1* | 5/2012 | Maeda | H01L 31/02013 136/251 |
| 2012/0152350 | A1* | 6/2012 | Kouyanagi | H02G 3/088 136/259 |
| 2012/0298189 | A1* | 11/2012 | Sasakura | H02G 3/16 136/251 |
| 2014/0102532 | A1* | 4/2014 | Nishimoto | H01L 31/0201 136/256 |
| 2014/0307408 | A1* | 10/2014 | Yamazaki | H02S 40/345 361/807 |

FOREIGN PATENT DOCUMENTS

| DE | 102010034860 A1 | 2/2012 |
|---|---|---|
| EP | 2296188 A1 | 3/2011 |
| EP | 2472598 A1 | 7/2012 |
| JP | 955520 A | 2/1997 |
| JP | 200124206 A | 1/2001 |

* cited by examiner

Primary Examiner — Courtney Smith
(74) Attorney, Agent, or Firm — The Webb Law Firm (57) ABSTRACT A terminal box that can be reliably fixed to a solar cell module is provided. The terminal box includes a bottom wall facing a back surface of the solar cell module, a top wall facing the bottom wall, side walls, and a housing space defined by the bottom wall, the top wall and the side walls to accommodate a component to be mounted. The bottom wall includes a limiting wall formed in a periphery of the bottom wall to project toward the solar cell module, and a communication opening for allowing a charging space defined by the limiting wall and the bottom wall to communicate with the housing space. The limiting wall defines a gap for allowing the charging space to communicate with external space of the limiting wall.

20 Claims, 5 Drawing Sheets

TERMINAL BOX

CROSS REFERENCE TO RELATED APPLICATIONS

This application claims priority to Japanese Patent Application No. 2013-099419 filed May 9, 2013, the disclosure of which is hereby incorporated in its entirety by reference.

TECHNICAL FILED

This disclosure relates to a terminal box connected to a solar cell module.

RELATED

Conventionally, a terminal box is attached to a solar cell module, the terminal box having a terminal strip connected to an output tab of the solar cell module. An output cable is connected to the terminal strip. Electric power generated by the solar cell module is supplied to an external device or the like through the output cable.

In general, the terminal box is fixed to a back surface of the solar cell module. As an example of a method of fixing the terminal box, it is known to adhere a bottom surface (surface fixed to the solar cell module) of a bottom wall of the terminal box to the solar cell module with an adhesive or a filler (referred to as "adhesive or the like" hereinafter) (see Japanese Unexamined Patent Application Publication No. 9-055520, for example.)

According to Japanese Unexamined Patent Application Publication No. 9-055520, in order to prevent the adhesive or the like from sticking out from an outer edge of the terminal box when the terminal box is pressed and fixed to the solar cell module, a limiting wall is provided in an outer peripheral edge of the bottom surface of the bottom wall of the terminal box.

On the other hand, Japanese Unexamined Patent Application Publication No. 2001-024206 discloses a method of fixing a terminal box dispensing with a bottom wall. According to this method, a filler is injected from a filler injection hole formed in a top wall of the terminal box to the interior of the terminal box, thereby to fix the terminal box to the solar cell module.

Further, according to Japanese Unexamined Patent Application Publication No. 2001-024206, a filler confirmation hole is provided in the top wall of the terminal box to determine that a sufficient amount of filler has been injected to the interior of the terminal box when the filler overflows the terminal box from the filler confirmation hole.

SUMMARY

According to the method disclosed in Japanese Unexamined Patent Application Publication No. 9-055520, while it is possible to prevent the adhesive or the like from sticking out from the terminal box, it is difficult to confirm that a sufficient amount of the adhesive or the like is applied. If the amount of the adhesive or the like is short, the adhesion may be disadvantageously poor or insufficient. In contrast, according to Japanese Unexamined Patent Application Publication No. 2001-024206, it is possible to perceive that a sufficient amount of filler has been injected because the terminal box has no bottom wall. However, if the filler injection hole and the filler confirmation hole disclosed in Japanese Unexamined Patent Application Publication No. 2001-024206 are combined with the bottomed terminal box, the filler might overflow the terminal box from the filler confirmation hole even if a sufficient amount of filler has not been injected between the bottom wall and the solar cell module. This is because air present in a space surrounded by the limiting wall and the back surface of the solar cell module cannot escape in the terminal box having the limiting wall defined in the bottom wall as disclosed in Japanese Unexamined Patent Application Publication No. 9-055520.

Embodiments of the present invention are terminal boxes reliably fixed to a solar cell module.

According to a preferred embodiment of the present invention, a terminal box attached to a back surface of a solar cell module includes a bottom wall facing the back surface of the solar cell module, a top wall facing the bottom wall, side walls, and a housing space defined by the bottom wall, the top wall and the side walls to accommodate a component to be mounted. The bottom wall includes at least one limiting wall formed in a periphery of the bottom wall to project toward the solar cell module, and at least one communication opening for allowing a charging space defined by the limiting wall and the bottom wall to communicate with the housing space. The limiting wall defines at least one gap for allowing the charging space to communicate with external space of the limiting wall.

With the above-described arrangement, the filler injected to the charging space through the communication opening formed in the bottom wall is restrained from spreading outward due to the limiting wall. Even if the filler spreads outward, air present in the charging space is pressed outward. If the air cannot escape, internal pressure of the charging space is increased. The increase in internal pressure may hinder the injection of the filler, as a result of which an air pocket is formed in the charging space. According to the above arrangement, however, air that has been forced by the filler can escape to the outside of the charging space through the gap defined in the limiting wall. Therefore, an air pocket is not easily formed in the charging space, and thus the charging space can be filled with the filler. This allows the terminal box to be rigidly fixed.

If an air pocket is formed in the charging space, the air may be heat expanded when the temperature of the terminal box is increased to generate a force in a direction to remove the terminal box from the solar cell module (referred to as "removing direction" hereinafter). According to the above arrangement, however, even if an air pocket is formed in the charging space, the expanded air can flow out of the terminal box to the outside through the gap. As a result, it is prevented that a force is exerted on the terminal box in the removing direction, thereby to maintain the fixation of the terminal box.

According to a preferred embodiment of the present invention, the limiting wall is formed as a double-sided tape. With such an arrangement, the terminal box can be temporarily fixed by the limiting wall, which facilitates an operation of fixing the terminal box.

The bottom wall may have various shapes. For example, the bottom wall may be polygonal, typically rectangular. When the bottom wall is polygonal, air pressed by the filler easily gathers around a corner of the polygon. Therefore, it is preferable that the gap is provided in any corner of the polygon when the bottom wall is polygonal. Such an arrangement prevents the formation of an air pocket. It should be noted that the definition of "polygon" or "polygonal" referred to in the present invention includes not only an accurate "polygon" but also any shape that can be regarded as a polygon. Similarly, the definition of "corner" referred to in the present invention includes not only an accurate apex of the polygon but also the vicinity of the apex.

The relationship between the communication opening and the gap is also variable. For example, the communication opening can be provided in the center of gravity of the polygon. In that case, the filler spreads radially from the center of gravity of the polygon. Therefore, it is preferable that the gap is provided in a corner of the polygon. Such an arrangement can restrain the formation of an air pocket. It should be noted that the center of gravity referred to in the present invention includes not only the accurate center of gravity but also the vicinity of the center of gravity.

Further, the gap may be provided in a first corner of the polygon. In that case, the communication opening is preferably provided in a side facing the first corner across the center of gravity of the polygon. Such an arrangement also can restrain the formation of an air pocket.

According to a preferred embodiment of the present invention, the top wall has an injection hole for injecting a filler to the charging space and the housing space, the injection hole being disposed in a position to overlap the communication opening at least in part as viewed from the top. With such an arrangement, the filler introduced through the injection hole is easily injected to the charging space. This can reduce the possibility that an air pocket is formed in the charging space.

Components such as a terminal strip and a diode are accommodated in the housing space. Since those components are placed between the top wall and the bottom wall, the supply of the filler to the charging space may be hindered if the arrangement is improper. In view of this, according to a preferred embodiment of the present invention, the component to be mounted is disposed in a position in which at least part of an overlapping portion of the injection hole and the communication opening is exposed as viewed from the top. With such an arrangement, the supply of the filler from the injection hole to the charging space is hindered less easily.

DESCRIPTION OF EMBODIMENTS

A terminal box according to one embodiment of the present invention will be described in detail hereinafter in reference to the accompanying drawings.

Figure 1:
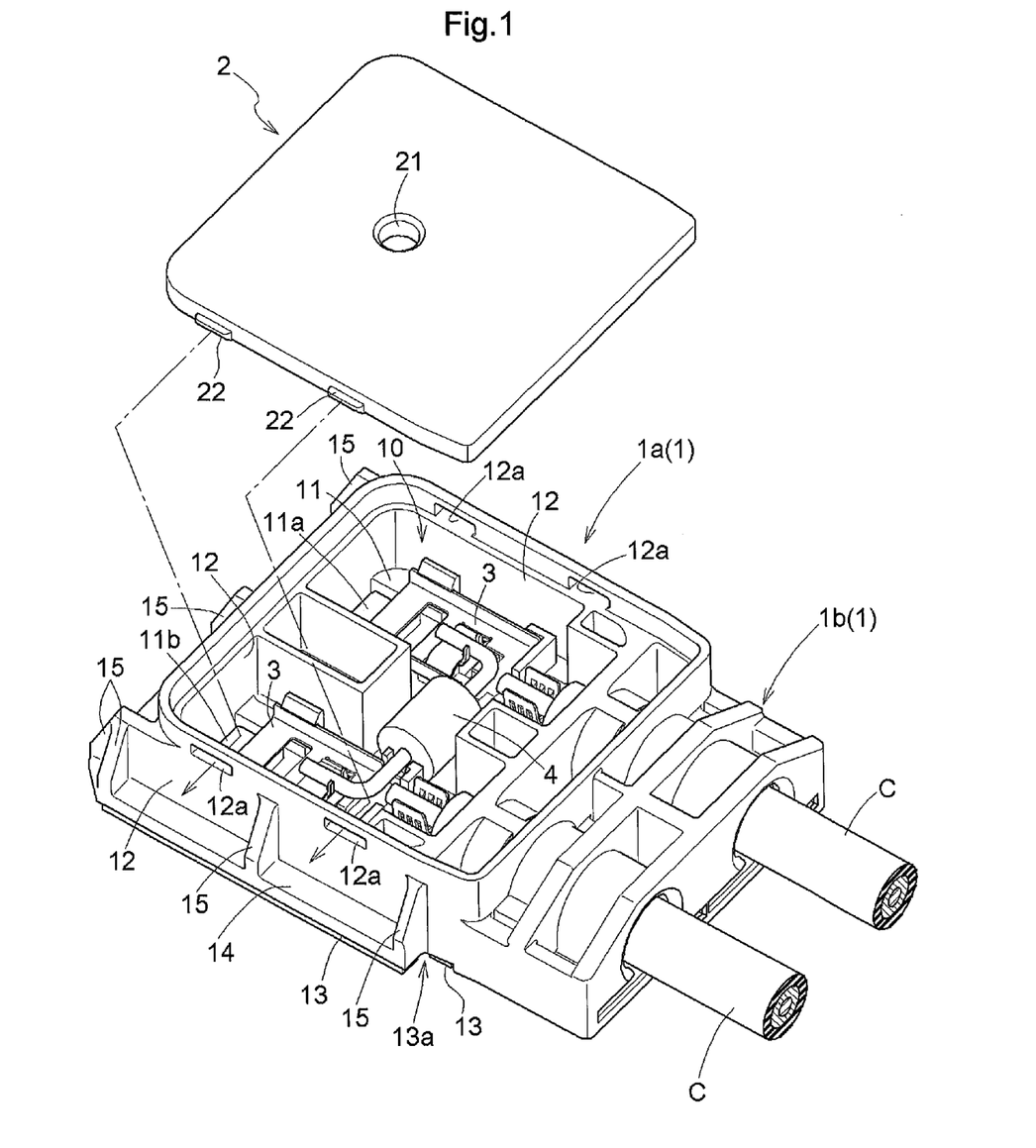
FIG. 1 is a partially exploded top-side perspective view of a terminal box.

Referring to FIG. 1, the terminal box is fixed to a back surface of a solar cell module (not shown) in a posture as shown. In the following description, a vertical direction is defined in reference to the posture of the terminal box shown in FIG. 1.

As illustrated, the terminal box of the present invention includes a main body 1 and a lid 2, both of which are made of resin.

The main body 1 has a casing 1a and a cable retainer 1b. An output cable C is inserted into the cable retainer 1b for fixation. Electric power generated by the solar cell module is supplied to an external load through the output cable C.

In the following description, a side to which the output cable C is connected is referred to as "back," a side opposite to the "back" is referred to as "front," and a side perpendicular to the fore-and-aft direction is referred to as "right" or "left" (or "lateral side").

The casing 1a has a bottom wall 11 and three side walls 12 extending upright from peripheral edges of the bottom wall 11. A housing space 10 is defined by the bottom wall 11, the side walls 12 and a front end surface of the cable retainer 1b together. More particularly, the casing 1a has a generally box shape opened upward. Within the housing space 10 is housed a terminal strip 3 (one example of a component to be mounted) to which an output tab (not shown) of the solar cell module is connected. To be more specific, the terminal strip 3 is fixed to a top surface of the bottom wall 11. In the current embodiment, two terminal strips 3, which are connected to each other through a diode 4 (one example of the component to be mounted), are provided. Each of the terminal strips 3 is connected to the output cable C guided into the housing space 10. This arrangement allows the solar cell module to be electrically connected to the external load, as a result of which electric power generated by the solar cell module can be supplied to the external load.

The bottom wall 11 extends outward of the front and right and left side walls 12 to form a flange 14. Ribs 15 are formed between a top surface of the flange 14 and outer surfaces of the side walls 12 to increase the strength of the flange 14.

Two engaging openings 12a are formed around an upper edge of each of the right and left side walls 12. Engaging pawl 22 of the lid 2, which will be described later, are fitted into the engaging openings 12a.

On the other hand, the lid 2 is a flat-plate element for covering an opening above the casing 1a, that is, the housing space 10 from above. The shape of the lid 2 is adapted to the shape of the casing 1a as viewed from the top, and is substantially rectangular in the current embodiment. The lid 2 forms a top wall of the unit. As seen from FIG. 1, an injection hole 21 vertically extends through the lid 2 to allow the housing space 10 to communicate with external space when the lid 2 is attached to the main body 1.

The engaging pawls 22 project laterally from right and left side surfaces of the lid 2. As described above, the engaging pawls 22 are fitted into the engaging holes 12a of the side walls 12 of the main body 1. As a result, the lid 2 is engaged with and fixed to the main body 1.

Figure 2:
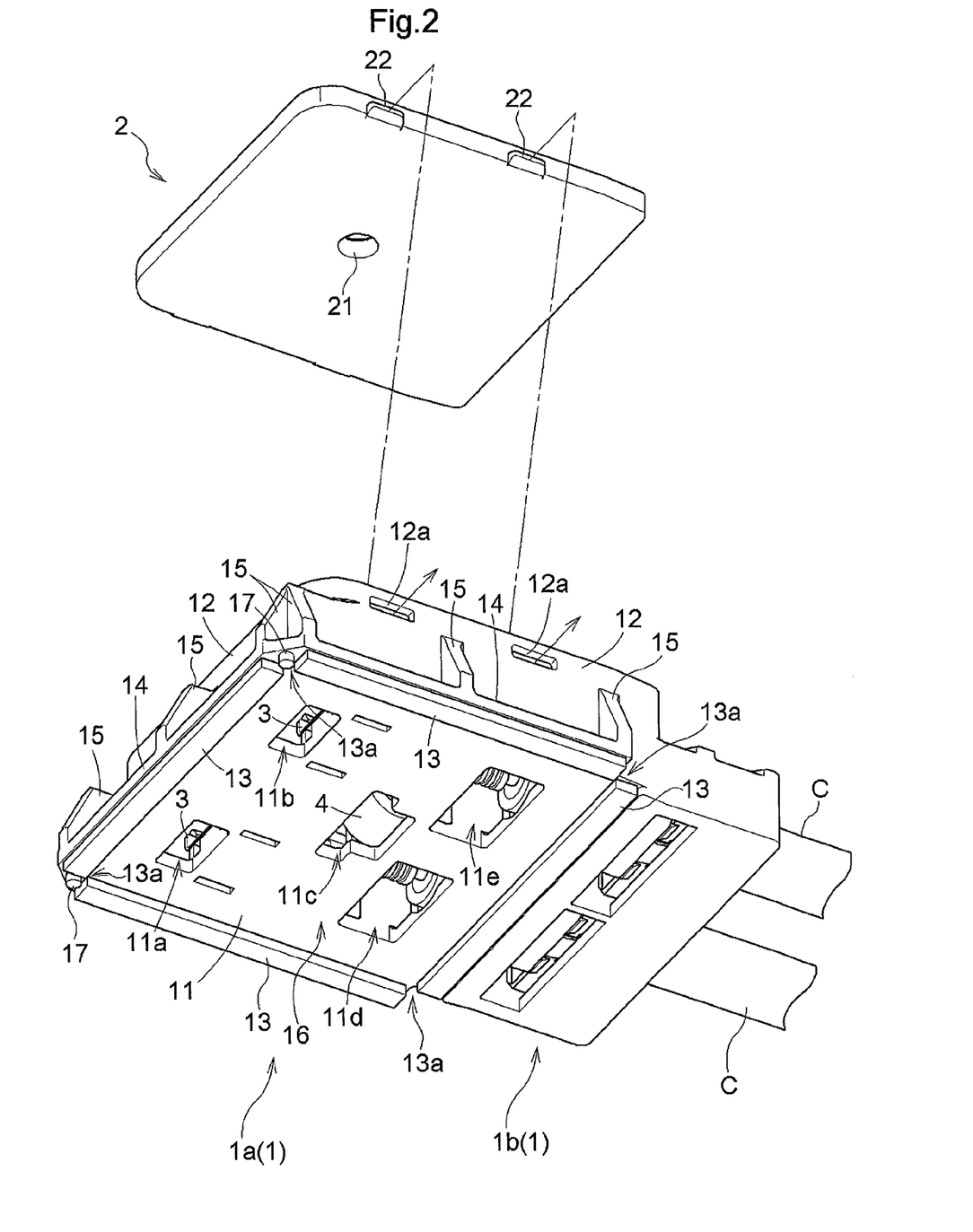
FIG. 2 is a bottom-side perspective view of the terminal box.

Referring to FIG. 2, the bottom wall 11 of the main body 1 is substantially a regular square as viewed from the top in the current embodiment. The bottom wall 11 has a bottom surface defined at a higher level than a bottom surface of the cable retainer 1b. Further, the bottom wall 11 has a pair of legs 17 formed at front corners of the bottom surface thereof. The legs 17 each have an end surface that is flush with the bottom surface of the cable retainer 1b. Hence, the pair of legs 17 and the bottom surface of the cable retainer 1b come into contact with the back surface of the solar cell module, thereby to stabilize the mounting posture of the terminal box.

A limiting wall 13 is formed in the back surface of the flange 14 of the bottom wall 11 and just in front of the cable retainer 1b to project downward, that is, toward the solar cell module. In the current embodiment, the limiting wall 13 is formed as an elastic double-sided tape. The limiting wall 13 has a bottom surface that is substantially flush with the bottom surface of the cable retainer 1b. Thus, the main body 1 can be temporarily fixed when pressed to the solar cell module. The limiting wall 13 may be integrally formed with the bottom surface of the bottom wall 11.

As illustrated in FIG. 2, the limiting wall 13 is shaped as an elongated plate extending along a side of the bottom wall 11. Since the bottom wall 1 is substantially a regular square in the current embodiment, four limiting walls 13 are provided. Those limiting walls 13 and the bottom surface of the bottom wall 11 define a charging space 16 together. As described later, a filler is injected to the charging space, thereby to fix the terminal box to the solar cell module. As shown, the adjacent limiting walls 13 are arranged so as not to contact each other, and gaps 13a are defined in the corners of the bottom wall 11 to allow the charging space 16 to communicate with the external space.

Still referring to FIG. 2, output tab receiving portions 11a and 11b are provided in a front end part of the bottom wall 11 of the main body 1. The output tabs of the solar cell module are introduced into the housing space 10 through the output tab receiving portions 11a and 11b. In the current embodiment, each of the output tab receiving portions 11a and 11b has a rear end aligned with a front end of each of the terminal strips 3.

Further, while a communication opening 11c is formed around the center of gravity of a polygon forming the bottom wall 11 of the main body 1, communication openings 11d and 11e are formed in a rear end part of the bottom wall 11. The housing space 10 and the charging space 16 are communicated with each other through the communication openings 11c, 11d and 11e. The housing space 10 and the charging space 16 are communicated with each other through the output tab receiving portions 11a and 11b as well. Therefore, the output tab receiving portions 11a and 11b also act as the communication openings in the present invention.

Figure 3:
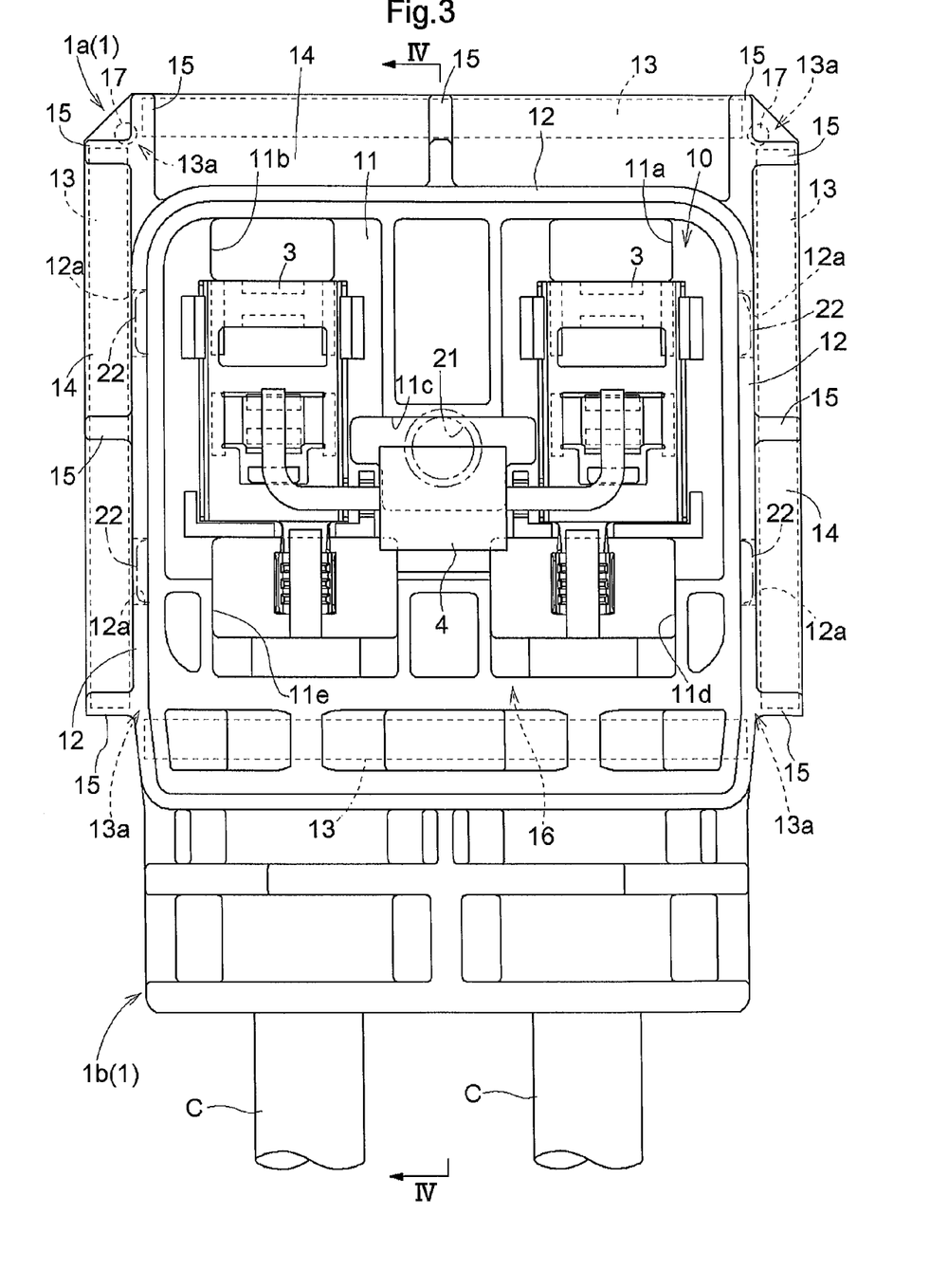
FIG. 3 is a top plan view of the terminal box.

In FIG. 3, the interior of the housing space 10 is visible through the lid 2. As shown, the components to be mounted such as the terminal strips 3 and the diode 4 that are housed in the housing space 10 are arranged so as not to hinder communication between the housing space 10 and the charging space 16. More particularly, the components to be mounted are arranged so as not to lie over the entire communication openings 11a to 11e as viewed from the top. In other words, the components to be mounted are arranged so that each of the communication openings 11a to 11e are visible at least in part as viewed from the top.

Still referring to FIG. 3, the injection hole 21 and the communication opening 11c are positioned so as to overlap each other at least in part. The diode 4 is arranged so as not to overlap the whole overlapping portion of the injection hole 21 and the communication opening 11c. In other words, the diode 4 is arranged so that the overlapping portion of the injection hole 21 and the communication opening 11c is visible at least in part as viewed from the top. Thus, the charging space 16 is visible from the injection hole 21 through the communication opening 11c as viewed from the top.

A process of fixing the terminal box to the solar cell module will be described hereinafter. First, two terminal strips 3 are fixed to the top surface of the bottom wall 11 of the main body 1. The diode 4 is connected between the two terminal strips 3. Then, the output cables C are fixedly inserted into the cable retainer 1b to be connected to the terminal strips 3. The main body 1 is temporarily fixed to the back surface of the solar cell module by the double-sided tapes acting as the limiting walls 13, with the output tabs of the solar cell module being guided into the housing space 10 through the communication openings 11a and 11b. Then, the output tabs are connected to the terminal strips 3.

In this state, the lid 2 is pressed downward from above the housing space 10. In this time, the side walls 12 are deformed outward by the action of the engaging pawls 22. When the lid 2 is further pressed down, the engaging pawls 22 are fitted into the engaging openings 12a. As a result, the lid 2 is engaged with and fixed to the main body 1.

Figure 4:
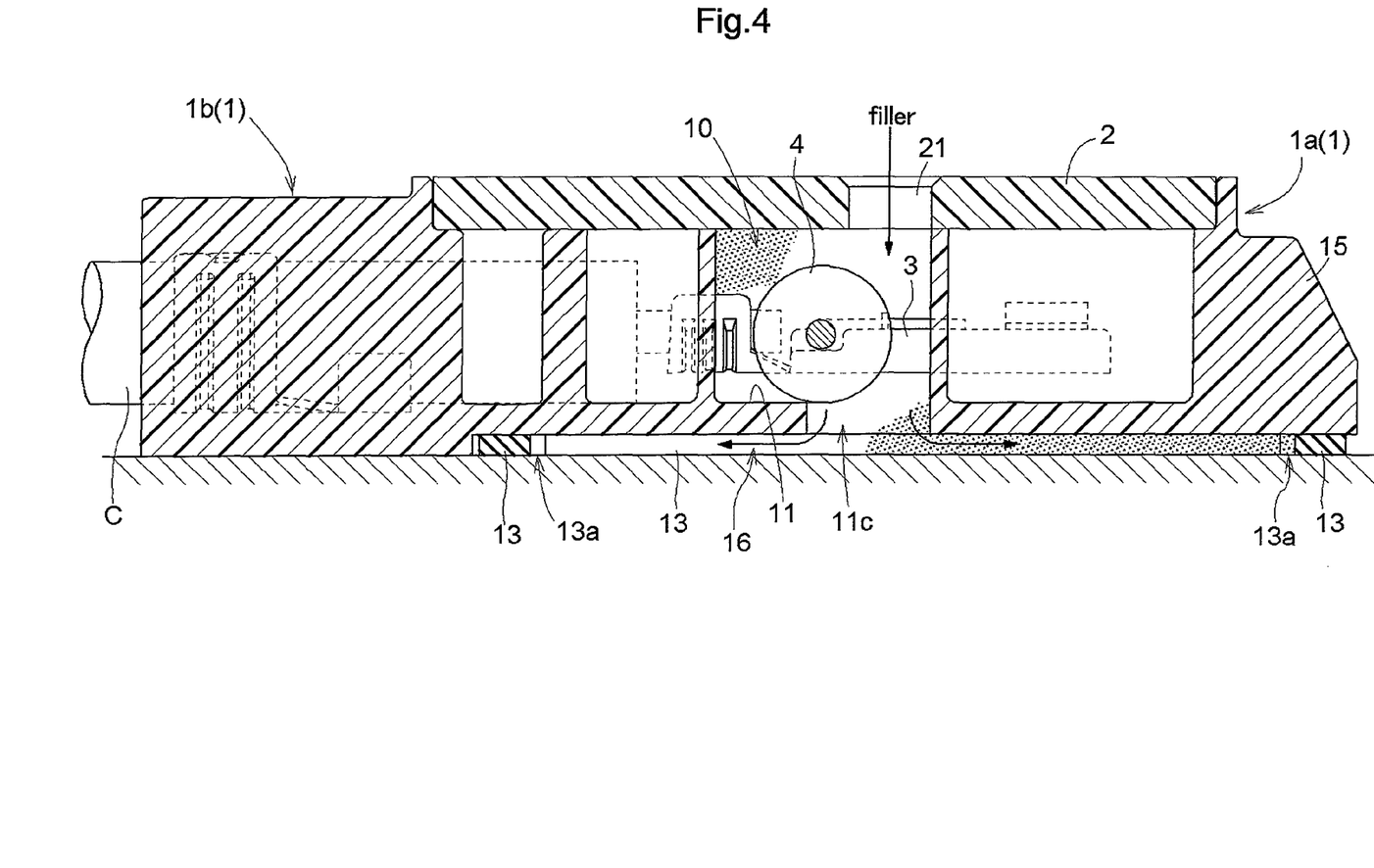
FIG. 4 is a cross-sectional side view of the terminal box.

In order to definitively fix the terminal box, the filler is charged through the injection hole 21, as shown in FIG. 4. Since the charging space 16 is visible from the injection hole 21 through the communication opening 11c as viewed from the top as described above, the filler injected into the housing space 10 from the injection hole 21 is supplied to the charging space 16 primarily through the communication opening 11c. The filler injected into the charging space 16 through the communication opening 11c spreads radially from around the center of gravity.

In the state in which the terminal box is temporality fixed to the back surface of the solar cell module, air is present in the charging space 16. Therefore, the filler spreads outward pressing the air outward. The air pressed outward is forced toward the corners of the bottom wall 11 along inner surfaces of the limiting walls 13. If the air is cut off from escape, internal pressure of the charging space 16 is increased to hinder the injection of the filler, which results in formation of an air pocket in the charging space 16. If such an air pocket is formed in the charging space 16, an amount of the filler to be injected is reduced to disadvantageously weaken the fixing strength of the terminal box. In view of this, according to the present invention, the air pressed toward the corners of the bottom wall 11 flows to the outside through the gaps 13a. This allows any air pocket to be formed less easily, and thus the terminal box can be rigidly fixed.

When the terminal box having an air pocket formed in the charging space 16 is heated, air in the charging space 16 expands. This expansion of air exerts a force to the terminal box in a direction to remove the terminal box. In other words, if an air pocket is formed in the charging space 16, the terminal box is easily removed. According to the present invention, even if an air pocket is formed in the charging space 16, such an air pocket is present around any corner of the bottom wall 11, and thus the expanded air flows out to the outside through the gaps 13a. Therefore, it is prevented that the terminal box is disadvantageously easily removed due to the expansion of air in the charging space 16.

In addition, since the communication openings 11a, 11b, 11d and 11e are positioned in corner directions as viewed from the communication opening 11c, the filler flowing along the top surface of the bottom wall 11 is supplied to the charging space through the communication openings 11a, 11b, 11d and 11e. Thus, the filler easily spreads around the corners of the charging space 16 as well.

Whether or not the charging space 16 has been filled with the filler can be recognized by the filler flowing into or out of the gaps 13a. More particularly, each gap 13a has a function as a discharge outlet for discharging air in the charging space as well as a function as a confirmation opening for confirming completion of injection of the filler to the charging space. An amount of the filler flowing into the gaps 13a and an amount of the filler flowing out of the gaps 13a (referred to collectively as "flow amount" hereinafter) vary depending on the properties of the filler to be used such as viscosity as well as the number, size, arrangement and the like of the gaps 13a. Therefore, it is preferable to adjust the number, size, arrangement and the like of the gaps 13a and predetermine a proper flow amount for the filler in accord with the viscosity of the filler to be used.

The filler is also injected to the housing space 10, thereby to protect the components such as the terminal strips 3 and the diode 4 mounted in the housing space 10.

In this manner, the present invention prevents the filler from spreading outward unnecessarily owing to the limiting walls 13, and further prevents any air pocket to be formed easily owing to the gaps 13a formed in the limiting walls 13.

Alternative Embodiments

Figure 5:
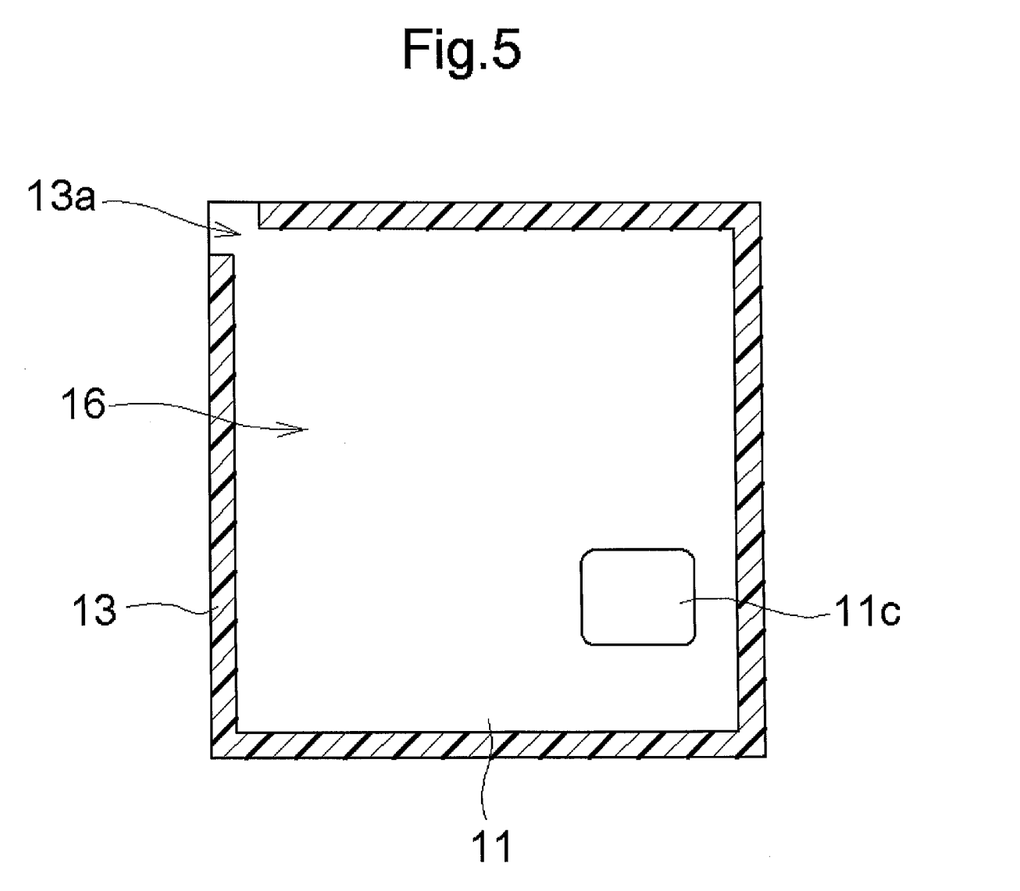
FIG. 5 is a schematic bottom view of the terminal box in an alternative embodiment.

[1] According to the above-described embodiment, the communication opening 11c is provided around the center of gravity of the bottom wall 11, and the gaps 13a are formed in the corners of the bottom wall 11. This arrangement is not limitative. For example, as shown in FIG. 5, one communication opening 11c may be provided around a corner of the bottom wall 11, while a gap 13a may be provided at another corner opposite to the corner at which the communication opening 11c is provided. In this case, the corner at which the communication opening 11c is provided is filled with filler first, and then the filler spreads pressing air toward the gap 13a. Therefore, such an arrangement also can restrain an air pocket from being formed in the charging space 16. In order to restrain the formation of an air pocket in the charging space, it is preferable that the communication opening 11c and the gap 13a are arranged so as to face each other across the center of gravity of the bottom wall 11. However, the number and arrangement of the communication opening 11c and the gap 13a are not limited to those shown in the current application, but may be varied at need within the scope for achieving the object of the present invention. The position of the injection hole 21 is preferably adapted to the communication opening 11c in order for the filler to be easily injected to the charging space 16.

[2] In the above-described embodiment, the bottom wall 11 is generally a regular square. Instead, it may have any other polygonal shape, or a circular or semicircular shape.

[3] In the above-described embodiment, the lid 2 covers the housing space 10 from above. Instead, the lid 2 may cover the housing space 10 from below. In that case, the side walls 12 are suspended from the top wall and the lid 2 forms the bottom wall 11.

[4] In the above-described embodiment, the gaps 13a are provided in the corners of the bottom wall 11. Instead, the gap(s) may be provided any other location such as a side of the bottom wall 11.

This disclosure may be used for a terminal box connected to a solar cell module.

What is claimed is:

1. A terminal box attached to a back surface of a solar cell module, comprising:
   a bottom wall facing the back surface of the solar cell module;
   a top wall facing the bottom wall;
   side walls; and
   a housing space defined by the bottom wall, the top wall and the side walls to accommodate a component to be mounted;
   wherein the bottom wall includes at least one limiting wall formed in a periphery of the bottom wall to project toward the solar cell module, and at least one communication opening for allowing a charging space defined by the limiting wall and the bottom wall to communicate with the housing space, and
   wherein the limiting wall defines at least one gap for allowing the charging space to communicate with external space of the limiting wall.

2. The terminal box according to claim 1, wherein the limiting wall is formed as a double-sided tape.

3. The terminal box according to claim 1, wherein the bottom wall is a polygon, and the gap is defined at a corner of the polygon.

4. The terminal box according to claim 3, wherein the communication opening is provided in the center of gravity of the polygon, and the gap is provided at a corner of the polygon.

5. The terminal box according to claim 3, wherein the gap is provided in a first corner of the polygon, and the communication opening is provided in a side facing the first corner across the center of gravity of the polygon.

6. The terminal box according to claim 1, wherein the top wall has an injection hole for injecting a filler to the charging space and the housing space, the injection hole being disposed in a position to overlap the communication opening at least in part as viewed from the top.

7. The terminal box according to claim 6, wherein the component to be mounted is disposed in a position in which at least part of an overlapping portion of the injection hole and the communication opening is exposed as viewed from the top.

8. The terminal box according to claim 2, wherein the bottom wall is a polygon, and the gap is defined at a corner of the polygon.

9. The terminal box according to claim 8, wherein the communication opening is provided in the center of gravity of the polygon, and the gap is provided at a corner of the polygon.

10. The terminal box according to claim 8, wherein the gap is provided in a first corner of the polygon, and the communication opening is provided in a side facing the first corner across the center of gravity of the polygon.

11. The terminal box according to claim 2, wherein the top wall has an injection hole for injecting a filler to the charging space and the housing space, the injection hole being disposed in a position to overlap the communication opening at least in part as viewed from the top.

12. The terminal box according to claim 3, wherein the top wall has an injection hole for injecting a filler to the charging space and the housing space, the injection hole being disposed in a position to overlap the communication opening at least in part as viewed from the top.

13. The terminal box according to claim 4, wherein the top wall has an injection hole for injecting a filler to the charging space and the housing space, the injection hole being disposed in a position to overlap the communication opening at least in part as viewed from the top.

14. The terminal box according to claim 5, wherein the top wall has an injection hole for injecting a filler to the charging space and the housing space, the injection hole being disposed in a position to overlap the communication opening at least in part as viewed from the top.

15. The terminal box according to claim 8, wherein the top wall has an injection hole for injecting a filler to the charging space and the housing space, the injection hole being disposed in a position to overlap the communication opening at least in part as viewed from the top.

16. The terminal box according to claim 9, wherein the top wall has an injection hole for injecting a filler to the charging space and the housing space, the injection hole being disposed in a position to overlap the communication opening at least in part as viewed from the top.

17. The terminal box according to claim 10, wherein the top wall has an injection hole for injecting a filler to the charging space and the housing space, the injection hole being disposed in a position to overlap the communication opening at least in part as viewed from the top.

18. The terminal box according to claim 11, wherein the component to be mounted is disposed in a position in which at least part of an overlapping portion of the injection hole and the communication opening is exposed as viewed from the top.

19. The terminal box according to claim 12, wherein the component to be mounted is disposed in a position in which at least part of an overlapping portion of the injection hole and the communication opening is exposed as viewed from the top.

20. The terminal box according to claim 13, wherein the component to be mounted is disposed in a position in which at least part of an overlapping portion of the injection hole and the communication opening is exposed as viewed from the top.

* * * * *